United States Patent

Knowlton

[15] 3,703,727

[45] Nov. 21, 1972

[54] METHOD FOR GENERATING RANDOM NUMERICAL QUANTITIES

[72] Inventor: Kenneth Charles Knowlton, Plainfield, N.J.

[73] Assignee: Bell Telephone Laboratories, Incorporated, Murray Hill, N.J.

[22] Filed: June 18, 1971

[21] Appl. No.: 154,399

[52] U.S. Cl. ......................444/1, 235/152, 235/156, 331/78

[51] Int. Cl. ..............................................G06f 7/22

[58] Field of Search .....444/1; 331/78; 235/152, 156; 178/22

[56] References Cited

OTHER PUBLICATIONS

The Rand Corporation, A Million Random Digits with 100,000 Normal Deviates. Glencoe, Ill., The Free Press, 1955 p. xxiii. A276.5R3.

Selby, S. M. et al. ed. Standard Mathematical Tables 14th ed. Cleveland, The Chemical Rubber Co., 1965, p. 251

*Primary Examiner*—Malcolm A. Morrison
*Assistant Examiner*—R. Stephen Dildine, Jr.
*Attorney*—R. J. Guenther et al.

[57] ABSTRACT

In a digital computer, random numbers exhibiting any desired numerical distribution are generated by accessing a table of stored random numbers having the desired distribution starting at a predetermined location and indexing in wrap-around fashion using a predetermined random skip distance. New starting points and skip distances are periodically generated using a conventional random number generator.

24 Claims, 5 Drawing Figures

INVENTOR
K.C. KNOWLTON
BY L.O. Wirtz
ATTORNEY

METHOD FOR GENERATING RANDOM NUMERICAL QUANTITIES

BACKGROUND OF THE INVENTION

1. Field of the Invention

This invention relates to the generation of random numbers and, more particularly, to a method for generating random numbers by means of a digital computer.

The growing use of digital computers in the modeling of real systems which exhibit statistical behavior and/or which operate on data which is statistical in nature has stimulated considerable interest in random number generators suitable for use with or implementation on such digital computing machinery. Depending on the application, the numbers to be generated may be required to have particular properties. They will usually, for example, be required to fall within a predetermined range (e.g., 0 through 9 or −100 through +100). They may, in addition, be required to exhibit a particular numerical distribution (e.g., a uniform distribution over the permissible range or a normal distribution over that range). Furthermore, it may be desirable to prevent entirely the occurrence of one or more numbers otherwise in the permissible range.

No deterministic process can be employed to generate truly random numbers. Indeed, any such process will, when restored to the same initial conditions, produce the same sequence of numbers. At best, such numbers will be pseudo-random, i.e., though not truly random, they will be sufficiently random for the intended purpose. For convenience, pseudo-random numbers are commonly referred to as random numbers, it being understood that tests must be made on any such numbers to verify their suitability in a particular application. Similarly, the numbers generated by the method of this invention will be referred to as random numbers although they are in fact only pseudo-random.

2. Description of the Prior Art

Many random number generation methods suitable for implementation on digital computing machinery are known. Several methods are discussed, for example, in an article entitled "Random Number Generators" by T. E. Hull and A. R. Dobell (Society for Industrial and Applied Mathematics Review, Vol. 4, No. 3, July 1962, pp. 230–254). This article also includes an extensive bibliography of other relevant publications. Typical of the known methods are the so-called multiplicative and mixed multiplicative methods for generating uniformly distributed random numbers. These methods require the performance of one or more arithmetic operations (e.g., multiplication and addition) in the generation of each number. Thus, although they produce numbers with good randomness, these methods are relatively slow. The known methods for generating nonuniformly distributed random numbers are even more complicated than those for generating uniformly distributed numbers. Moreover, none of the commonly employed methods is capable of generating directly both uniformly and nonuniformly distributed numbers.

It is therefore an object of this invention to generate random numbers in a rapid and efficient manner.

It is a more particular object of this invention to generate random numbers in a digital computer without recourse to elaborate arithmetic operations.

It is another object of this invention to provide a method for generating random numbers having any desired numerical distribution.

SUMMARY OF THE INVENTION

These and other objects of this invention are accomplished by accessing a table containing relatively few numbers distributed randomly according to any desired numerical distribution in a manner which permits the table to be used as a source of a relatively large number of random numbers having that distribution. More particularly, a prime number of locations are set aside in the memory of a digital computer for the storage of a source table of random numbers. The numbers in this table may have any desired numerical properties or characteristics. Each time a random number is needed, this source table is accessed at a location a predetermined number of locations away from the location at which the table was last accessed. This predetermined number of locations is conveniently called the skip distance. The table is accessed in wrap-around fashion so that the memory is never accessed outside the limits of the table.

After a predetermined number of references to the table has been made, a more standard uniform random number generator is employed to generate a new random skip distance. A new random starting point and number of references may also be generated. This process may be repeated indefinitely or until statistical deficiencies in the results require replacement of the numbers in the source table.

Further features and objects of this invention, its nature, and various advantages, will be more apparent upon consideration of the attached drawings and the following detailed description of the invention.

DETAILED DESCRIPTION OF THE INVENTION

Figure 1:
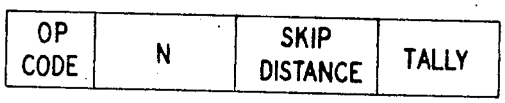
FIG. 1 illustrates one possible organization of a machine language level instruction for use in implementing the random number generating method of this invention.

The random number generating method of this invention may be implemented in a variety of ways. FIG. 1, for example, illustrates a machine language level digital computer instruction which may be conveniently employed in the practice of the method of this invention. It will later be shown that a relatively few symbolic language level instructions can be employed to replace the instruction of FIG. 1 in programs written for digital computers of a general purpose type which do not have the capability of responding to an instruction of the type illustrated in FIG. 1.

The instruction of FIG. 1, hereinafter referred to as the wrap-index instruction, has four fields. As is typical of machine language level instructions in many general purpose digital computers, the instruction of FIG. 1 has a leftmost field containing an OP CODE number which, when interpreted, controls interpretation and use of the data in the remaining fields. The leftmost data field, labelled N, may contain any predetermined, preferably prime, integer number (e.g., 127) which defines the number of addressable storage locations in a source table of random numbers stored in the memory of the computer. The field labelled SKIP DISTANCE may contain any integer number, from 1 to N−1 inclusive, which is employed as discussed in greater detail below to control accessing of or reference to the numbers in the stored source table. Finally, the field labelled TALLY contains a third integer quantity which establishes the number of random numbers to be generated before reinitializing the instruction (i.e., changing the quantity in field SKIP DISTANCE and restoring the quantity in field TALLY to its initial value or any other desired value).

Figure 2:
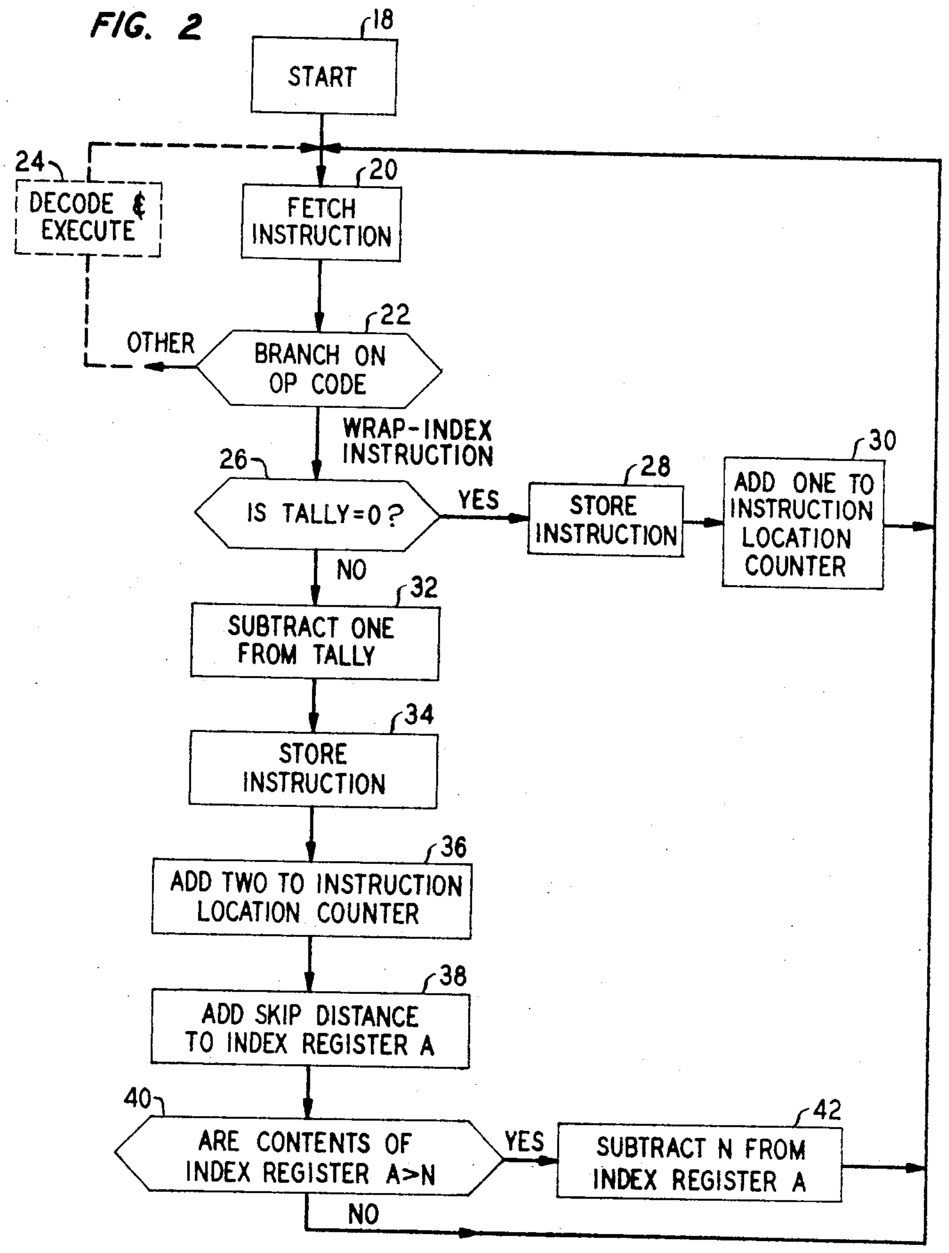
FIG. 2 illustrates the operations performed in a digital computer in response to the instruction of FIG. 1.

During execution of a program by a computer having a typical organization and mode of operation, successive instructions are selected or addressed by an instruction location counter and read out of memory for interpretation and execution as shown in FIG. 2. Each selected instruction is fetched (functional block 20) when selected and a decision as to the type of instruction made on the basis of the contents of the OP CODE field (functional block 22). If an instruction other than the wrap-index instruction is encountered, the instruction is decoded and executed in the customary manner as indicated generally by block 24. Thereafter, another instruction is read and the process continued.

Whenever the wrap-index instruction of FIG. 1 is encountered in the execution of a program, control passes from block 22 to block 26 for interpretation and execution of that instruction. As shown in block 26, the quantity in field TALLY is first compared to zero. If the quantity in field TALLY is equal to zero, indicating the need to reinitialize the wrap-index instruction, the instruction is restored to memory (block 28), the instruction location counter is incremented by one (block 30), and control is returned to the instruction location counter to initiate execution of the next instruction (block 20). It is necessary to store the wrap-index instruction as mentioned above (block 28) since in most computers the instruction fetching operation (block 20) destroys the image of the fetched instruction in memory.

If the quantity in field TALLY is greater than zero, a random number is to be generated. Accordingly, control passes to functional block 32. At block 32 one is subtracted from the quantity in field TALLY and the wrap-index instruction, thus modified, is stored in memory (block 34). Thereafter, the instruction location counter is incremented by two (block 36). As indicated by functional block 38, the quantity in field SKIP DISTANCE is then added to the contents of one of the computer's index registers, designated index register A hereinafter. As will be discussed in greater detail below, index register A is used to store a quantity, hereinafter called the index quantity, indicative of the particular stored random number to be accessed as the next random number output quantity.

After incrementing the index quantity in register A by the SKIP DISTANCE as described above, the index quantity is compared to the quantity in field N of the wrap-index instruction (block 40). Since, as mentioned above, there are only N numbers in the source table of random numbers, it would be inappropriate for the index quantity to exceed N. As long as the SKIP DISTANCE is a number less than N, the index quantity can always be brought within the acceptable range (i.e., any value from one through N) by subtracting N from the contents of that register any time N is exceeded (block 42). Thereafter, control is returned to functional block 20 for execution of the next instruction indicated by the instruction location counter.

It can be seen from the foregoing discussion that execution of the wrap-index instruction described above causes the index quantity in index register A to be incremented by the SKIP DISTANCE in a manner comparable to modulo N arithmetic, the index quantity ranging from 1 through N rather than from 0 through N−1 for convenience in this discussion. Thus, repeated execution of the wrap-index instruction will cause the index quantity to take on successively larger values in the range from one through N. Eventually another addition of the SKIP DISTANCE to the index quantity increments that quantity to a value larger than N. N is therefore subtracted from the index quantity to reduce it to a permissible value. Thereafter, further executions of the wrap-index instruction again cause successively larger values to appear in index register A. This wrap-around incrementation of an index quantity leads to the designation "wrap-index" for the instruction of FIG. 1.

The wrap-around incrementation described above has the property that if N is a prime number and the SKIP DISTANCE is any positive integer less than N, the index quantity in index register A will eventually take on all values from one to N. In particular, after N executions of the wrap-index instruction, all integer quantities from one to N will have appeared in index register A exactly once. If, as mentioned briefly above, each number appearing in index register A is used as the address of a random number in a table of N random numbers, then after N executions of the wrap-index instruction, each of the N random numbers in the table will have been addressed exactly once. A subsequent N execution of the instruction would cause the stored numbers to be addressed a second time in exactly the same sequence. This will generally be statistically undesirable and is prevented in accordance with the principles of this invention by periodically or irregularly reinitializing the wrap-index instruction, in particular, by replacing the quantity in field SKIP DISTANCE with a new value. This will cause the numbers in the tale to be accessed in a completely different sequence which will, for most purposes, appear to be statistically unrelated to the first sequence.

Figure 3:
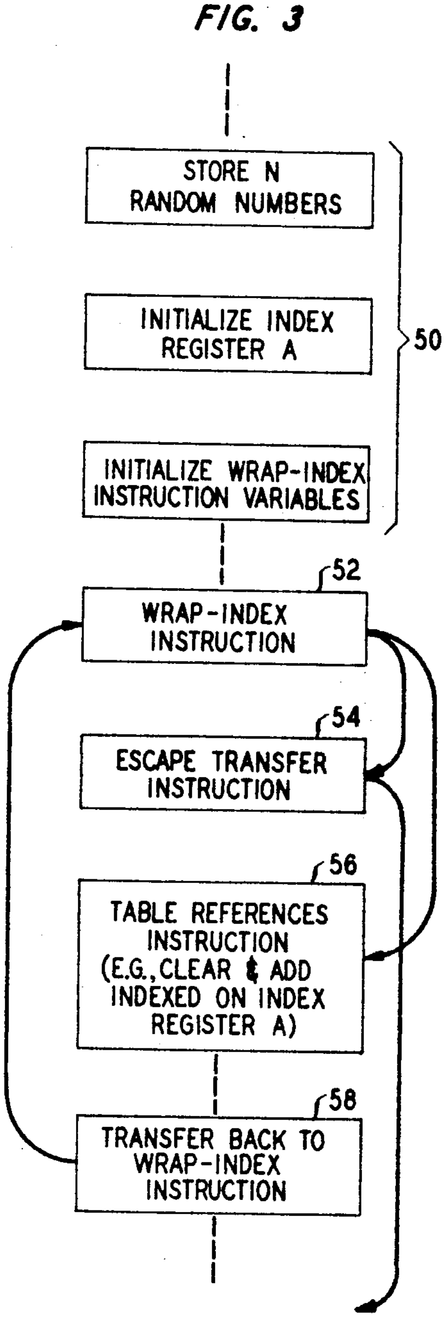
FIG. 3 illustrates the manner in which the instruction of FIG. 1 may be employed in a sequence of instructions to generate random numbers in accordance with the method of this invention.

FIG. 3 illustrates the sequence of instructions in a typical program employing the wrap-index instruction of FIG. 1. Early in the instruction sequence of FIG. 3, instructions 50 are provided to load any suitable table of N random numbers into the memory of the computer. Alternatively, this table may be supplied as a part of the data for the program. Random numbers suitable for this purpose may be found, for example, in any published table of random numbers. These numbers may, of course, have any desired statistical properties, e.g., a predetermined numerical distribution and range. Additional instructions are included to initialize index register A and any of the wrap-index instruction fields which are variable (i.e., can be altered and are not established at the time the program is loaded into the computer). Index register A may be initialized to any value from one through N. This may be done by specifying a suitable value or by generating a suitable random number using any of the well known random number generators. Similarly, either or both of the quantities in fields SKIP DISTANCE and TALLY may be initialized to any suitable values if such values have not already been supplied. Again, these values may either be specified or generated by a classical random number generator.

Thereafter, whenever one or more random numbers are required wrap-index instruction 52 is addressed. As long as the quantity in field TALLY remains greater than zero, execution of wrap-index instruction 52 (as discussed in detail above) will be followed by execution of table reference instruction 56. This is, of course, the result of the addition of two to the instruction location counter whenever TALLY is found to be greater than zero, thereby causing instruction 54 to be skipped. Table reference instruction 56 may be any instruction suitable for accessing the memory of the computer to bring into the processing unit of the computer the random number stored at the source table location indicated by the contents of index register A. Accordingly, table reference instruction 56 may be any clear-and-add type instruction indexed on index register A, e.g., an instruction which loads an arithmetic register with a value taken from a memory location determined by the sum of a reference address quantity and the index quantity in index register A. Thereafter, instructions may be provided for storing or otherwise utilizing the random number thus provided. When another random number is required, control is transferred back to wrap-index instruction 52 by an instruction like instruction 58.

Since the quantity in field TALLY is reduced by one each time the wrap-index instruction is executed, that quantity will eventually be reduced to zero indicating the need to reinitialize the instruction, in particular, the need to change the quantity in field SKIP DISTANCE. When this occurs, execution of wrap-index instruction 52 is followed by execution of transfer instruction 54 rather than table accessing instruction 56. This occurs, of course, because one rather than two is added to the instruction location counter during execution of the wrap-index instruction when the quantity in field TALLY is equal to zero. Transfer instruction 54 may be any transfer instruction which transfers control around table reference instruction 56 and instructions logically dependent thereon. In particular, transfer instruction 54 may conveniently transfer control to instructions for reinitializing wrap-index instruction 52. As part of any such reinitialization, the quantity in field SKIP DISTANCE is changed and the quantity in field TALLY is restored to some suitable value greater than zero. In addition, a new starting point for the wrap-indexing of this invention may be generated by replacing the contents of index register A with any other suitable quantity. The numerical quantities required in the reinitialization of the wrap-index instruction may, of course, be either specified directly or generated using any of the well-known random number generators. Finally, after some preselected number of reinitializations, the table of random numbers may be replaced by a new table and reinitialization then allowed to continue as before.

In this connection, it is to be observed that if the N entries in the table are unique, then by using N different starting points with each of N−1 different skip distances $N^2$−N sequences (i.e., permutations) of these N entries may be generated. This, of course, requires that the quantity in field TALLY is reset to N in the course of each reinitialization. If, on the other hand, the quantity in field TALLY is reset to any number from 1 to N, then $N^3$−$N^2$ sequences (of length 1 to N) may be generated.

It can be seen that the wrap-index instruction of FIG. 1 can be most effectively employed as the first instruction in a program loop for rapidly generating a sequence of several random numbers. Such a loop conveniently ends with an instruction like instruction 58 for transferring control back to the wrap-index instruction. Since the quantity in field TALLY is reduced by one each time the wrap-index instruction is executed, that quantity can be used as the loop index provided the number of random numbers to be generated in this manner is not too large. When as many random numbers as are required have been generated and the quantity in field TALLY is consequently reduced to zero, execution of wrap-index instruction 52 is followed by execution of transfer instruction 54 which transfers control outside the loop defined by instructions 52 and 58, e.g., to the reinitializing instructions mentioned above.

Figure 4:
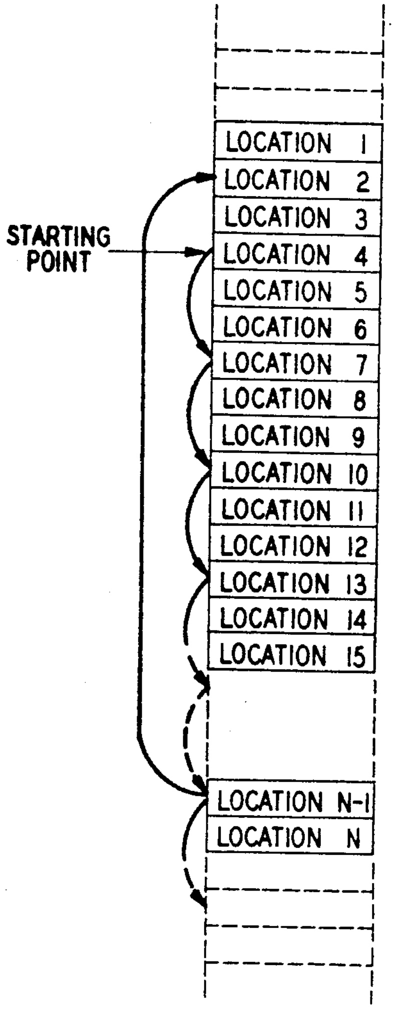
FIG. 4 illustrates the manner in which the source table in the memory of the computer is accessed in accordance with the method of this invention.

FIG. 4 illustrates the manner in which a source table of N random numbers stored in the memory of a computer is accessed using the wrap-index instruction of this invention. In the particular example shown in FIG. 4, index register A initially contains one and the SKIP DISTANCE is three. During the first execution of the wrap-index instruction, three (the SKIP DISTANCE) is added to one (the contents of register A) with the result that four appears in index register A. Accordingly, the first random number generated will be the number stored in location 4 of the source table. Subsequent executions of the wrap-index instruction result in successive additions of the SKIP DISTANCE three to the contents of register A, thereby causing the accessing of the numbers stored in locations 7, 10, 13, 16, 19, etc. Assuming, for example, that this sequence ultimately causes the number in location N−1 to be accessed, it will be apparent that a subsequent addition of three to the quantity N−1 would causes accessing of memory location N+2, i.e., a location outside the limits of the source table. This does not happen, of course, because N is always subtracted from any index quantity greater than N. Consequently, in this example, location 2 is accessed after location N−1, thereby illustrating the wrap-around indexing or accessing of this invention.

Since the ultimate source of the random numbers generated by the foregoing method is a table of numbers stored in the memory of the computer, it will be readily apparent that random numbers having any desired numerical properties can be generated by this method simply by storing numbers having the desired properties in the source table. In particular, the numbers generated by the foregoing method will have the same range and numerical distribution as the numbers in the table.

The wrap-index method of this invention can be employed on general purpose digital computers even without the availability of the wrap-index instruction of FIG. 1. Moreover, only a relatively few instructions are needed to replace the wrap-index instruction. The IBM 7094 assembly language coding, for example, is extremely brief. If index register 5 is used to index the table and index register 7 is used to perform the function of the quantity TALLY in the wrap-index instruction, the required instructions are as follows:

```
TXI  *+1,5,37   skip (currently by 37)
TIX  *+1,5,127  wrap around on table (N=127)
TIX  *+2,7,1    countdown to reinitialization.
```

The first of the instructions in the above sequence instructs the computer to add 37 (the current skip distance) to the contents of index register 5 and then execute the next instruction as indicated by the expression *+1. The second instruction causes the subtraction of 127 (the number of random numbers in the source table in the example to which the above instructions apply) from the contents of register 5 if the contents of that register exceed 127 followed by execution of the next instruction (as indicated by the expression *+1). The last instruction causes the subtraction of one from the contents of index register 7 followed by execution of the instruction after the next sequential instruction (as indicated by the expression *+2) as long as the contents of register 7 are greater than one or execution of the next sequential instruction if the contents of register 7 are less than or equal to one. It will be evident from the foregoing that these three assembly language instructions correspond almost exactly to the wrap-index instruction of FIG. 1. They may therefore be used in place of wrap-index instruction 52 in any instruction sequence like that of FIG. 3 with appropriate modifications to the other instructions to render them compatible with the more extensive use of index registers.

Figure 5:
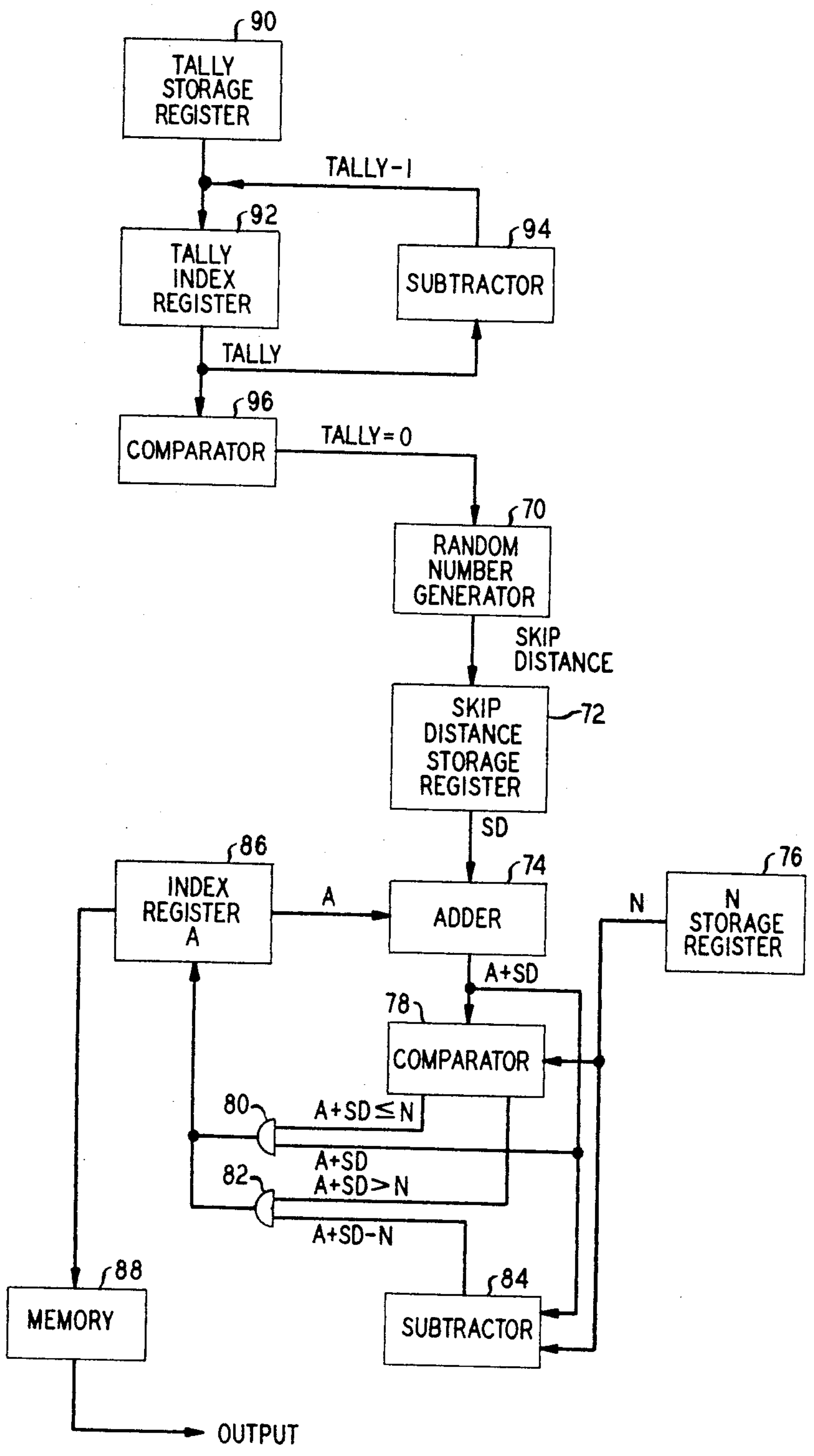
FIG. 5 illustrates apparatus constructed in accordance with the principles of this invention and suitable for generating random numbers by the method of this invention.

FIG. 5 illustrates apparatus suitable for accessing a table of N random numbers stored in memory 88 in accordance with the wrap-index method of this invention. Initially, random number generator 70 generates a suitable SKIP DISTANCE quantity which is applied to and stored in storage register 72. Each time the table in memory 88 is to be accessed, this SKIP DISTANCE is added to the contents of index register A by adder 74 and the resulting sum applied to comparator 78 for comparison with quantity N stored in storage register 76. If the quantity produced by adder 74 is less than or equal to N, comparator 78 applies a gate enabling voltage to gate 80, thereby applying the quantity produced by adder 74 to index register 86. The quantity produced by adder 74 is also applied to subtractor 84 which subtracts N therefrom. In the event that the quantity produced by adder 74 is greater than N, comparator 84 applies a gate enabling voltage to gate 82 rather than to gate 80, thereby applying the quantity produced by subtractor 84 to index register 86. After index register 86 has been thus updated, memory 88 is accessed at a storage location determined by the quantity in index register 86 to produce an output random number. The balance of the apparatus of FIG. 5 is employed in straight-forward manner to count down to reinitialization of the SKIP DISTANCE.

It is to be understood that the embodiments shown and described herein are illustrative of the principles of this invention only and that modifications may be implemented by those skilled in the art without departing from the scope and spirit of the invention. For example, various other applications of the wrap-index accessing method of this invention will occur to those skilled in the art. If entries are originally chosen and ordered with care, many sequences useful for computational or other purposes can be generated simply by specifying the necessary three parameters, i.e., starting point, skip distance, and number of entries to be accessed.

What is claimed is:

1. The method of accessing a table of entries stored in the memory of a digital computer comprising the steps of:
   computing a starting address, a skip distance, and a predetermined number of said entries to be accessed;
   accessing said predetermined number of entries by successively incrementing said starting address with said skip distance in wrap-around fashion; and
   recalculating said skip distances after accessing said predetermined number of entries.

2. The method defined in claim 1 wherein said skip distance is computed by a random process.

3. The method defined in claim 1 wherein said skip distance is recalculated by a random process.

4. The method of accessing a table of N entries stored in the memory of a digital computer comprising the steps of:
   computing a starting address, skip distance, and a predetermined number of said entries to be accessed;
   accessing said predetermined number of entries by successively incrementing said starting address with said skip distance modulo N; and
   recalculating said skip distance after accessing said predetermined number of entries.

5. The method defined in claim 4 wherein said skip distance is computed by a random process.

6. The method defined in claim 4 wherein said skip distance is recalculated by a random process.

7. The method of accessing a table of entries stored in the memory of a digital computer comprising the steps of:
   1. computing a starting address, a skip distance, and a predetermined number of said entries to be accessed;
   2. accessing said predetermined number of entries by successively incrementing said starting address by said skip distance in wrap-around fashion;
   3. recalculating said skip distance after accessing said predetermined number of entries; and
   4. repeating steps (2) and (3).

8. The method defined in claim 7 wherein said skip distance is computed by a random process.

9. The method defined in claim 7 wherein said skip distance is recalculated by a random process.

10. The method of accessing a table of N entries stored in the memory of a digital computer comprising the steps of:

1. computing a starting address, a skip distance, and a predetermined number of said entries to be accessed;
2. accessing said predetermined number of entries by successively incrementing said starting address by said skip distance modulo N;
3. recalculating said skip distance after accessing said predetermined number of entries; and
4. repeating steps (2) and (3).

11. The method defined in claim 10 wherein said skip distance is computed by a random process.

12. The method defined in claim 11 wherein said skip distance is recalculated by a random process.

13. The method of accessing a table of N random numbers stored in the memory of a digital computer comprising the steps of:

1. computing a starting address, a skip distance, and a predetermined number of said random numbers to be accessed;
2. accessing said predetermined number of random numbers by successively incrementing said starting address by said skip distance in wrap-around fashion;
3. recalculating said skip distance after accessing said predetermined number of random numbers; and
4. repeating steps (2) and (3).

14. The method defined in claim 13 wherein said skip distance is computed by a random process.

15. The method defined in claim 13 wherein said skip distance is recalculated by a random process.

16. The method of accessing a table of N random numbers stored in the memory of a digital computer comprising the steps of:

1. computing a random starting address, a random skip distance, and a predetermined number of said numbers to be accessed;
2. accessing said predetermined number of random numbers by successively incrementing said starting address said skip distance modulo N;
3. recalculating said random starting address and said random skip distance after accessing said predetermined number of random numbers; and
4. repeating steps (2) and (3).

17. The method defined in claim 16 wherein N is a prime number.

18. The method of computing address quantities stored in an index register for use in accessing a table of N entries stored in the memory of a digital computer comprising the steps of:

computing an initial random address quantity and storing said quantity in said index register;
computing a random skip distance;
successively adding said skip distance to the contents of said index register modulo N to compute a first plurality of address quantities;
recalculating said random skip distance;
successively adding said recalculated skip distance to the contents of said index register modulo N to compute a second plurality of address quantities.

19. The method defined in claim 18 wherein N is a prime number.

20. Apparatus for accessing a table of stored digitally coded quantities comprising:

means for successively incrementing an index quantity by a predetermined skip distance in wrap-around fashion; and
means responsive to said index quantity for selecting from said table each of said quantities indexed by said index quantity.

21. The apparatus defined in claim 20 further comprising means for periodically recomputing said skip distance.

22. The apparatus defined in claim 21 further comprising limiting the size of said table to a predetermined prime number of quantities.

23. Apparatus for accessing a table of digitally coded quantities to produce a sequence of digitally coded output quantities comprising:

means for initiating said sequence at a predetermined position in said group; and
means for re-entrantly skipping through said table in wrap-around fashion by a predetermined skip distance.

24. The apparatus defined in claim 23 further comprising means for periodically recomputing said skip distance.

* * * * *